Figure 1:
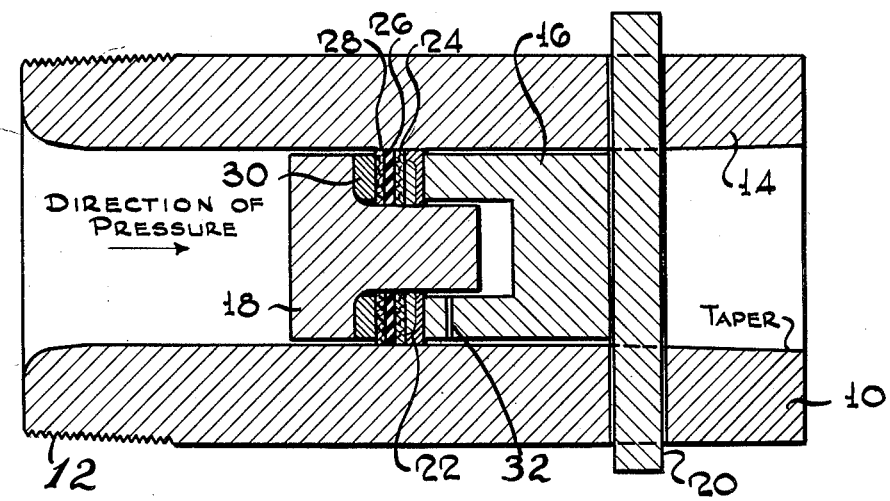

Francis R. Russell
Robert H. Mueller   Inventors

Patented Mar. 11, 1952

2,589,144

UNITED STATES PATENT OFFICE 2,589,144

PRESSURE RELEASE EQUIPMENT

Francis R. Russell, Scotch Plains, and Robert H. Mueller, Plainfield, N. J., assignors to Standard Oil Development Company, a corporation of Delaware Application August 1, 1946, Serial No. 687,794

4 Claims. (Cl. 220—89)

This invention relates to an excess pressure release device, and in particular to a pressure relief device for equipment under high pressures.

In the fabrication of high pressure equipment, pressure relief devices form an essential part of the equipment. The functioning of such devices depends upon their operation within narrowly prescribed limits. In the prior art, pressure relief devices for moderately high pressures have been constructed with calibrated shear-resisting elements as the basis of their essential activities. In the case, however, of extremely high pressures, namely between 3,000 and 250,000 pounds per square inch, means for protecting the shear-resisting element from inadvertent operation and material fatigue are particularly important. Also, in the case of safety devices connected to high pressure equipment, the avoidance of leakage through the devices is necessary.

In the design of devices according to the present invention, a uniqueness is in regard to the use of packing to prevent inadvertent operation or leakage at high pressures before the critical value is reached for complete release. Furthermore, the devices designed according to the present invention are suitable for attachment to equipment suitable for processing at pressures of the order of between 3,000 and 250,000 pounds per square inch as distinct from prior art safety devices which in general are suitable for equipment operating under high pressures of lower values.

Clearly, the simplest means of packing a joint is to have easily compressible materials such as those of rubbery or fibrous nature compressed in the areas of expected leakage. This type of packing is satisfactory under the most favorable conditions only to a leaking pressure value equal to the force of compression upon the packing material. For values of fluid pressure higher than that of the compression upon the packing material, the packing shrinks away from the walls of the retaining structure and leakages occur. The packing used can be either a "Bridgman" type packing, or a simple plug of compressible material backed up by a very close-fitting support.

According to the Bridgman principle of unsupported area,[1] compressible packing material in annular confinement about a joint on the down pressure side of the compression means transmits to the walls of the retaining structure a pressure due to a force applied on the annular area equal to the fluid pressure multiplied by the total cross-sectional area of the joint. Thus, the intensity of pressure in the packing under such conditions is greater than the intensity of the applied fluid pressure in the ratio of the combined cross-sectional areas of the packing and central unsupported core to the cross-sectional area of the packing alone. By geometrical design, therefore, under such conditions the hydrostatic pressure in the packing is automatically maintained at a fixed percentage higher than the fluid pressure and leakage cannot occur as long as either the packing remains soft or the walls of the retaining structure hold.

As commonly employed in the devices of the present invention, packing according to the Bridgman principle of unsupported area consists of washers made of pliable compressible material such as rubber sandwiched between washers of other and harder materials such as leather, copper, etc., retained in the annular space formed between the projecting and recessed pieces of a two-piece piston. For applications requiring the safety release to operate under high temperature conditions, the packing can be made of suitable asbestos and metallic washers. In this manner, the annular mass of packing is under a pressure which is greater than the intensity of the fluid pressure in the ratio of the area of the piston exposed to the pressure to the area of the packing. This type of packing is employed as a means for withholding from the immediate cause of pressure relief in the applicants' design of pressure relief devices the pressures below the critical limit in the extremely high pressure range, namely, between 3,000 and 250,000 pounds per square inch. The packing also transmits to the essential pressure relief element that value of the pressure for which the device as a whole is calibrated to function.

Tests with Bridgman packings have shown their friction to be of the order of 1,000 to 2,000 pounds of force on pistons of 1" to 2" in diameter. Such friction may be utilized as a safety factor on the design blow-out pressure. Should this friction be undesirable, however, as it might well be in cases demanding a very exact release pressure, the two-piece Bridgman piston may be replaced with a solid metal piston and the pressure sealed by an oversized rubber plug supported by an oversized leather or fibre disc next to the piston. Tests have shown that for pressures as high as 120,000 pounds per square inch, such packing, much simpler than that according to

[1] "The Physics of High Pressure," P. W. Bridgman, G. Bell & Sons, London, 1931.

the Bridgman principle of unsupported area, may be employed.

The modified form of packing in devices of the present invention has been found to be satisfactory for pressures as high as 120,000 pounds per square inch when operating temperatures are not so high as to preclude the use of rubberlike materials. This simpler form of packing consists of an oversized tight-fitting plug of rubber, silicone polymer or other such compressible materials capable of withstanding the corrosive attack of the chemicals to which it may be exposed. Such a plug or stopper is suitably backed by a tight-fitting fibre or soft metal washer which is preferably cup-shaped in order to prevent extrusion of the rubberlike material past the piston.

In the applicants' device, shear pins or shear plates in contact with a cutting edge upon a piston are the immediate means for effecting the pressure release, and the packing is employed as a means of preventing such pressure release mechanism from leaking until the critical pressure is attained for failure of the shear pin or shear plate. The shear pin or plate is preferably made of heat-treated metal of sufficient hardness to prevent Brinelling or slow shearing; tests have shown steel pins and plates of 300 to 450 Brinell hardness to be usually satisfactory.

It is an object of the present invention, therefore, to furnish devices advantageous as pressure relief devices operative over a wide range of high pressure. It is also an object of the invention to furnish pressure relief devices in which packing glands are employed by means of which inadvertent operation or leakage at high pressures before the critical value is reached for complete release, is obviated. Other objects of the invention will appear apparent from the following description and illustration of a particular embodiment.

Figure 2:
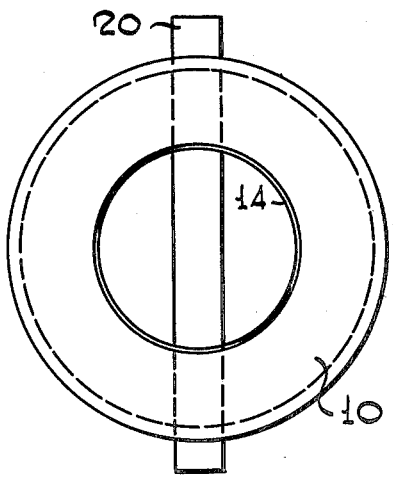
Figure 3:
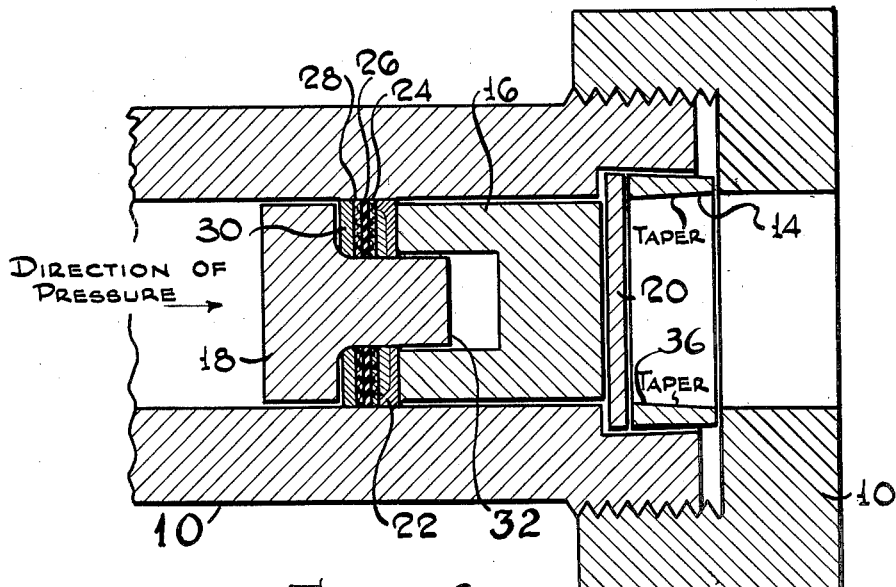
Figure 4:
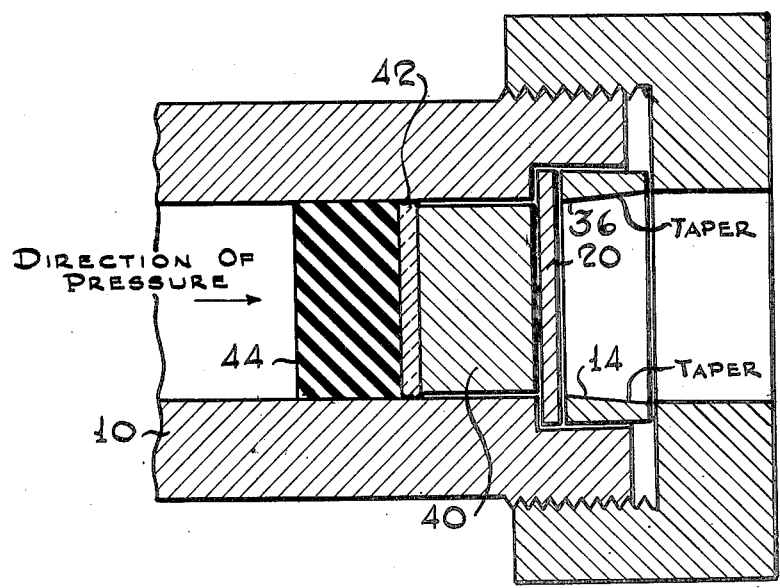

In Figures 1, 2 and 3, embodiments of the invention are shown suitable for attachment to equipment operating under pressures of the order of between 3,000 and 250,000 pounds per square inch. Figures 1 and 3 present sectional elevational views of the embodiments, and Figure 2 is an end view of the embodiment illustrated in Figure 1. In Figure 4, illustration is presented as a sectional elevational view of an embodiment of the invention advantageous for attachment to equipment operating under pressures up to about 120,00 pounds per square inch.

In order that the invention may be more fully understood, the following descriptions of specific embodiments are presented. In these descriptions, similar numerals are employed for similar parts. These descriptions of particular embodiments are presented merely as illustrations, and not as limitations, of the design of the device according to the invention.

In Figures 1, 2 and 3, embodiments of the invention are shown for attachment to equipment in which extremely high pressures are employed. In Figures 1 and 3 is shown a cylinder of metal 10, one end 12 of which is externally threaded in a tapering manner for connecting to a reactor or other such pressure vessel while at the other end 14 it is internally tapered outwards. Within the cylinder 10, a two-piece piston 16—18 is located. The female portion of the piston 16 is in contact with a renewable shear-resisting element 20. The shear-resisting element 20, calibrated for shearing at a particular value, may be either a square-shaped pin (Figures 1 and 2) or a plate (Figures 3 and 4). The piston 16, around its circumference, in contact with the shear-resisting element 20 is provided with a sharp, square cutting face. Between the two portions of the piston 16—18 are located the various packing materials. In contact with the annular portion of the piston 16 is a brass cup 22 filled with a soft metal filler. Adjacent to this cup is a leather washer 24 followed by a rubber washer 26 which is followed by a leather washer 28 and finally a metal washer 30 in contact with the piston 18. A weep hole 32 is drilled through the piston 16. In this device, the unsupported area is the cross-section of the male extension of piston 18 or female recess of piston 16.

In the embodiment of the invention illustrated in Figure 3, the hardened shear pins shown in the embodiment illustrated in Figures 1 and 2 are replaced by a hardened metal disc. Also, a replaceable cylindrical die 36 may be employed. These differences may be considered improvements over the device shown in Figures 1 and 2. In the device illustrated in Figures 1 and 2, the shear pin was fitted into a hole, preferably rectangular, in the body of the safety device and the supporting agent for the pin was therefore part of the safety release cylinder itself. For maximum strength of this safety cylinder, the metal in the walls should not be hardened to the extent of being a good cutting agent. Under such circumstances, the pins may be either too soft to give long reproducible life or the supporting surface in the cylinder wall may be dulled at the edge by repeated shearing operations. As an improvement, therefore, in the embodiment of the invention illustrated in Figure 3, the die 36 is made separately from the body of the safety device and can therefore be made as hard as desired and can be replaced or sharpened as desired. Moreover, the die may be tapered in its entire length to allow the sheared disc and piston assembly to pass through with ease. If the die is to be sharpened a number of times, it is preferable to taper only a portion of the die near the exit end so that sharpening the face of the die will not change its inside diameter since tests have shown that the shear force varies if the die clearance changes appreciably. The shear plates, however, should be hard enough to resist Brinelling and yet tough enough to shear rather than crack (Bhn 400–450 depending upon the material characteristics). The "punch and die" should be made harder.

In Figure 4, an embodiment involving such improvements is also shown. In this embodiment, a hardened shear plate supported on a die, the face of which can be ground for sharpening, is shown. Figure 4 also shows the simple form of packing which can usually be used instead of the Bridgman type packing. Thus, in Figure 4, a single piston 40 is employed. Piston 40 has a cutting face in contact with the shear-resisting element 20. On the pressured side, the piston 40 is in contact with an oversized fibre washer 42 which prevents the oversized rubber plug 44 from extruding past piston 40 when pressure is applied. Both the fibre disc 42 and the rubber plug 44 are compressed against the piston 40. As in the case of the embodiment illustrated in Figures 1 and 2, the ends of the device can be internally tapered at the end of the separate hardened "die" 36 and externally threaded for attachment at the end of body 12.

In the embodiments illustrated respectively in Figures 1, 2, 3 and 4, the shear-resisting element 20 is easily removable and renewable. In the case of the pins, the shear-resisting element may be threaded through suitably sized holes in the structure 10. In the case of the shear-resisting plate as shown in Figs. 3 and 4, such an element may be suitably held in place by the screwing of a retainer cap onto a suitable externally threaded section of the cylinder 10. The illustrated forms of embodiments of the invention are presented merely as illustrations of devices designed according to the invention. The general design of devices according to the invention are improvements over the usual rupture discs since tests of the shearing force on unhardened (keystock) steel pins and on hardened shear plates have indicated surprisingly good uniformity within 1% of the shearing force. By using pins or plates hardened to about 400 Brinell or even harder when the supporting die can be made separately from the cylindrical body as illustrated in the embodiments shown in Figures 4 and 4, the phenomenon of Brinelling can be eliminated and long life at the working pressure assured.

Thus, an advance over prior art devices involving the usual blowout discs and patches occurs. The shear-resisting pin or plate in devices designed according to the applicants' invention should, however, not be constructed too hard as it would crack under load instead of shear. Suitable hardness range for the shear-resisting elements depends upon the material used. In general, however, hardness of over 500 Brinell for the piston or body and die cutting edge and 350–400 for the shear pins have been found advantageous. In devices designed according to the invention, the blowout outlet should have some means of protection in case of blowout of the piston so as to prevent hazards and maintain the piston undamaged. Thus, a cup may be threaded over the outlet in order to retain the center portion of the shear pin and the piston in the cylinder but permit the pressure to be released through the shear pin holes. Also the disrupted pieces of the shear pin and piston may be withheld in a padded receptacle. Such safety precautions, however, can be suited to the particular application.

What is claimed is:

1. A relief valve comprising a hollow cylindrical housing, the housing being provided with an annular recess opening inwardly, a replaceable hollow cylindrical die in the recess, a round shear-resisting plate extending transversely across the housing and extending into the recess between the wall of the recess and the end of the die, an expandible packing closure within the housing on the high pressure side of the shear-resisting plate, and adapted to prevent leakage of high pressure fluid to the shear-resisting plate, a solid piston harder than the shear plate freely movable within the housing and interposed between the packing closure and the shear-resisting plate whereby excessive pressure against the packing closure causes the piston to shear the shear-resisting plate against the replaceable cylindrical die.

2. A relief valve according to claim 1 in which the inner wall of the die tapers radially outwardly.

3. A relief valve according to claim 1 in which the packing closure is an oversize rubber plug and a fiber washer.

4. A relief valve comprising a hollow cylindrical housing, the housing being provided with an annular recess opening inwardly, a replaceable hollow cylindrical die in the recess, a round hardened shear-resisting plate extending transversely across the housing and extending into the recess between the wall of the recess and the end of the die, the shear plate being of a hardness to resist Brinelling and yet tough enough to shear rather than crack, the die being harder than the shear plate, an expandible packing closure within the housing on the high pressure side of the shear-resisting plate, adapted to prevent leakage of high pressure fluid to the shear-resisting plate, a hardened solid piston harder than the shear plate freely movable within the housing and interposed between the packing closure and the shear-resisting plate whereby excessive pressure against the packing closure causes the hardened piston to shear the hardened shear-resisting plate against the replaceable cylindrical die.

FRANCIS R. RUSSELL.
ROBERT H. MUELLER.

REFERENCES CITED

The following references are of record in the file of this patent:

UNITED STATES PATENTS

| Number | Name | Date |
| --- | --- | --- |
| 1,052,938 | McKeen, Jr. | Feb. 11, 1913 |
| 1,649,210 | Bastian | Nov. 15, 1927 |
| 1,796,200 | Grieshaber | Mar. 10, 1931 |
| 2,141,835 | Allen | Dec. 27, 1938 |
| 2,141,847 | Tennant | Dec. 27, 1938 |
| 2,474,826 | Cantlin | July 5, 1949 |

FOREIGN PATENTS

| Number | Country | Date |
| --- | --- | --- |
| 216,036 | Great Britain | May 22, 1924 |